United States Patent
Seo et al.

(10) Patent No.: US 10,606,272 B2
(45) Date of Patent: Mar. 31, 2020

(54) METHOD FOR GUIDING PARKING MODE IN REMOTE AUTOMATIC PARKING SUPPORT SYSTEM

(71) Applicant: Hyundai Motor Company, Seoul (KR)

(72) Inventors: Gil Won Seo, Gyeonggi-do (KR); Jun Soo Kim, Seoul (KR); Chan Hee Jung, Gyeonggi-do (KR); Wan Seok Yang, Seoul (KR); Sung Yun Kim, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 152 days.

(21) Appl. No.: 15/653,830

(22) Filed: Jul. 19, 2017

(65) Prior Publication Data
US 2018/0024559 A1 Jan. 25, 2018

Related U.S. Application Data

(63) Continuation-in-part of application No. 15/279,306, filed on Sep. 28, 2016, now Pat. No. 10,137,888.

(30) Foreign Application Priority Data

Jul. 20, 2016 (KR) .................. 10-2016-0091891

(51) Int. Cl.
*G05D 1/02* (2020.01)
*B62D 15/02* (2006.01)
(Continued)

(52) U.S. Cl.
CPC .......... *G05D 1/021* (2013.01); *B62D 15/0285* (2013.01); *G08G 1/14* (2013.01);
(Continued)

(58) Field of Classification Search
CPC ...... G05D 1/021; B62D 15/0285; G08G 1/14; G08G 1/145; G08G 1/144; G08G 1/143; B60W 30/06
See application file for complete search history.

(56) References Cited

U.S. PATENT DOCUMENTS 7,263,420 B2 * 8/2007 Tanaka ............... B62D 15/0285
701/36
7,599,773 B2 * 10/2009 Tanaka ............... B62D 15/0285
340/932.2
(Continued)

FOREIGN PATENT DOCUMENTS

KR 2011-0114893 A 10/2011
KR 10-2016-0033524 A 3/2016

*Primary Examiner* — Frederick M Brushhaber
(74) *Attorney, Agent, or Firm* — Mintz Levin Cohn Ferris Glovsky and Popeo, P.C.; Peter F. Corless

(57) ABSTRACT

A method for guiding a parking mode in a remote automatic parking support system is provided. The remote automatic parking support system includes a first mode and a second mode. In the first mode, automatic parking is performed based on a parking request from a smart key or a smartphone of a driver positioned extraneous to a vehicle and in the second mode, automatic parking is performed based on a parking request from a switch mounted within the vehicle. The vehicle is guided in first mode or the second mode based on a surrounding environment, thereby providing optimal convenience to the driver.

11 Claims, 2 Drawing Sheets

(51) Int. Cl.
   *G08G 1/14*   (2006.01)
   *B60W 30/06*  (2006.01)
(52) U.S. Cl.
   CPC ............. *G08G 1/144* (2013.01); *G08G 1/145*
       (2013.01); *B60W 30/06* (2013.01); *G08G*
       *1/143* (2013.01)

(56) References Cited

U.S. PATENT DOCUMENTS

| | | | | |
|---|---|---|---|---|
| 7,724,180 B2* | 5/2010 | Yonak | ................... | G01S 13/931 342/70 |
| 8,319,614 B2* | 11/2012 | Takano | ................... | B60R 1/00 340/3.1 |
| 9,505,403 B2* | 11/2016 | Stefan | ................ | B62D 15/0285 |
| 9,522,675 B1* | 12/2016 | You | ........................ | B60W 30/06 |
| 9,676,414 B2* | 6/2017 | Oyama | ............. | B62D 15/0285 |
| 9,846,430 B2* | 12/2017 | Hiei | ........................ | B60Q 9/00 |
| 2009/0121899 A1* | 5/2009 | Kakinami | ............ | B62D 15/027 340/932.2 |
| 2010/0019934 A1* | 1/2010 | Takano | ..................... | B60R 1/00 340/932.2 |
| 2010/0332078 A1* | 12/2010 | Hering | .................... | G01S 15/87 701/36 |
| 2014/0156148 A1* | 6/2014 | Kikuchi | ................ | B62D 15/027 701/48 |
| 2014/0222252 A1* | 8/2014 | Matters | ................. | B62D 15/027 701/2 |
| 2015/0081174 A1* | 3/2015 | Marczok | ................ | B60Q 9/005 701/41 |
| 2015/0175205 A1* | 6/2015 | Park | .................... | B62D 15/0285 701/41 |
| 2016/0078766 A1* | 3/2016 | Kiyokawa | ........... | B62D 15/0285 340/932.2 |
| 2018/0022345 A1* | 1/2018 | Seo | ........................ | G08G 1/168 701/2 |
| 2018/0024559 A1* | 1/2018 | Seo | ........................ | G05D 1/021 701/23 |
| 2018/0105167 A1* | 4/2018 | Kim | ....................... | B60W 30/06 |
| 2018/0105208 A1* | 4/2018 | Kim | ....................... | B62D 15/0285 |
| 2018/0107207 A1* | 4/2018 | Kim | ....................... | B60W 30/06 |
| 2018/0208114 A1* | 7/2018 | Kinoshita | ................. | B60R 1/00 |

\* cited by examiner

METHOD FOR GUIDING PARKING MODE IN REMOTE AUTOMATIC PARKING SUPPORT SYSTEM

CROSS-REFERENCE TO RELATED APPLICATION

This application is a continuation in part of U.S. application Ser. No. 15/279,306, filed Sep. 28, 2016, pending which is based on and claims the benefit of priority to Korean Patent Application No. 10-2016-0091891, filed on Jul. 20, 2016, in the Korean Intellectual Property Office, the disclosure of which is incorporated herein in its entirety by reference.

TECHNICAL FIELD

The present disclosure relates to a method for guiding a parking mode in a remote automatic parking support system and, more particularly, to a technique of guiding a first mode in which automatic parking is performed based on a parking request from a smart key or a smartphone of a driver positioned extraneous to a vehicle and a second mode in which automatic parking is performed based on a parking request from a switch mounted within a vehicle, based on a surrounding environment, in a remote automatic parking support system.

BACKGROUND

In general, a smart cruise control (SCC) system, a smart parking assist system (SPAS), a lane keeping assist system (LKAS), a blind spot detection (BSD) system, a lane departure warning system (LDWS), a side obstacle warning system (SOWS), and the like, are installed within vehicles to assist drivers' convenience and driving. Particularly, the number of installed systems differs according to vehicle types and classes. In other words, all the systems may be installed in a vehicle of high specifications, while only some of the systems may be installed in a vehicle of low specifications.

A remote automatic parking support system is a system installed within a vehicle, in which, a process of searching for a parking space, among the entire parking processes, is performed by the intervention of a driver, and after a parking space is detected, parking is automatically performed without intervention of the driver. In other words, the remote automatic parking support system automatically performs gear-shifting, steering, a vehicle speed adjustment, and the like, required in a process of moving the vehicle to the parking space detected by the driver.

The remote automatic parking support system has a first mode in which automatic parking is performed based on a parking request via a smart key or a smartphone of a driver positioned extraneous to a vehicle and a second mode in which automatic parking is performed based on a parking request through a switch or other input mounted within the vehicle, and performs automatic parking in the first or second mode based on a driver's selection. A related art remote automatic parking support system, however, is not capable of guiding an optimal parking mode regarding a space (detected parking space) in which a vehicle is intended to be parked, and thus, a driver may not be able to exit the vehicle due to shortage of extra space after parking. Additionally, the related art remote automatic parking support system is not capable of guiding an optimal parking mode in regards to weather (e.g., snow, rain, strong wind, temperature, and the like), causing potential driver discomfort and inconvenience.

SUMMARY

The present disclosure provides a method for guiding a parking mode in a remote automatic parking support system having a first mode in which automatic parking is performed based on a parking request from a smart key or a smartphone of a driver positioned extraneous to a vehicle and a second mode in which automatic parking is performed based on a parking request from a switch mounted within the vehicle, capable of providing optimal convenience to a driver by guiding the first mode or the second mode according to a surrounding environment.

Technical subjects of the present disclosure are not limited to the foregoing technical subjects and any other technical subjects not mentioned herein may be clearly understood by a person skilled in the art from the present disclosure described hereinafter. Also, it may be easily understood that the advantages, features and aspects of the present disclosure may be realized by means and combinations demonstrated in claims.

According to an exemplary embodiment of the present disclosure, a method for guiding a parking mode in a remote automatic parking support system may include: detecting a surrounding environment while a parking space is being searched; guiding a first parking mode in which automatic parking is performed based on a parking request from a driver's terminal positioned extraneous to a vehicle or a second mode in which automatic parking is performed based on a parking request from a switch or other input mounted within the vehicle, based on the detected surrounding environment; and performing automatic parking in a parking mode selected by a driver.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
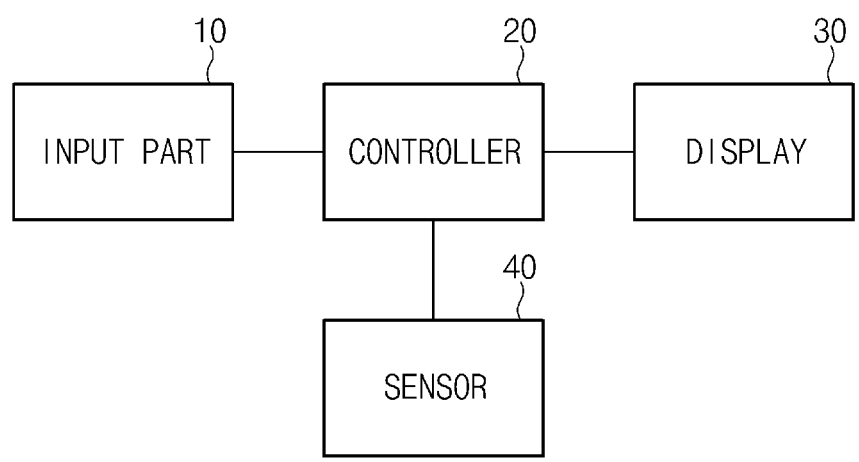
FIG. 1 is a view illustrating a configuration of an exemplary embodiment of a remote automatic parking support system to which the present disclosure is applied.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The aforementioned objects, features and advantages will become more apparent through the following detailed description with respect to the accompanying drawings, the technical idea of the present disclosure with a person of ordinary skill in the art to which the present disclosure pertains, accordingly, can be easily carried out. In describing the present disclosure, when it is determined that a detailed description of known techniques associated with the present disclosure unnecessarily obscure the gist of the present disclosure, the detailed description thereof will be omitted.

Exemplary embodiments of the present disclosure will now be described in detail with reference to the accompanying drawings. FIG. 1 is a view illustrating a configuration of an exemplary embodiment of a remote automatic parking support system to which the present disclosure is applied. As illustrated in FIG. 1, the remote automatic parking support system to which the present disclosure is applied may include an input part 10, a controller 20, a display 30, and a sensor 40. The input part 10 may be an input device, interface, or receiving component configured to receive user input and the controller 20 may be configured to operate the input part 10, the display 30, and the sensor 40.

In particular, the input part 10 may be configured to receive a selection signal regarding a parking mode from a terminal (e.g., a smart key or a smartphone) of a driver. The input part 10 may provide a wireless communication interface with respect to the smart key or the smartphone. The input part 10 may also be configured to receive a selection signal regarding a parking mode from a switch or other input (e.g., switch, button, toggle, or the like) mounted within the vehicle. In particular, the switch may be operated by the driver. Additionally, the input part 10 may be configured to receive a selection signal regarding a parking mode from a touch pad provided in an audio, video, navigation (AVN) system and the touch pad is operated by the driver.

Further, the controller 20 may be configured to execute general operate to enable each of the elements to function normally. Particularly, the controller 20 may be configured to perform operations necessary to park the vehicle, for example, steering acceleration, braking, gear changes and the parking brake until the parking operation is completed. In particular, the controller 20 may include a memory configured to store an algorithm (first mode algorithm) required for performing automatic parking based on a parking request from the driver's terminal positioned extraneous to the vehicle and an algorithm (second mode algorithm) required for performing automatic parking based on a parking request from the switch mounted within the vehicle.

In particular, for the first mode, the driver may select a desired parking space from the possible candidates presented by the controller 20 and switch the control method to the driver's terminal positioned extraneous to the vehicle while the vehicle is stationary. Here, the driver located outside the vehicle remotely controlling the automatic parking operation may be referred to as "an operator." The operator is capable of changing the selected parking space using a terminal. The operator may then activate the parking operation using the terminal.

Furthermore, for the second mode, the controller 20 may be configured to search for possible parking spaces. The search may be initiated by the driver. The controller 20 may then be configured to inform the driver of an identified possible parking space. When multiple possible parking spaces are identified, the controller 20 may present the candidates and the driver may select an intended parking space from the candidates. The driver may authorize automated parking operation and the controller 20 may be supervised by the driver seated within the vehicle. With the automatic control of steering, acceleration, deceleration, braking and gear changes, the controller 20 may be configured to move the vehicle at a certain speed, for example about 10 km/h or less, park the vehicle in the target parking space within the specified location accuracy limits, and finally release control.

In particular, when the driver has difficulty in exiting the vehicle after parking (e.g., due to space constraints) or when an average speed from the start point of searching for a parking space and an end point exceeds a threshold value, the controller 20 may be configured to guide the vehicle in the first mode through the display 30 (e.g., park the vehicle based on the first mode). Additionally, during poor weather conditions (e.g., snow, rain, etc.), the controller 20 may be configured to guide the vehicle in the second mode through the display 30 (e.g., park the vehicle based on the second mode).

For example, the controller 20 may be configured to detect rain using a rain sensor mounted within an auto wiper system of the vehicle, and sense an ambient temperature using a temperature sensor. In addition, in performing automatic parking, the controller 20 may be configured to automatically select front end parking or back-in parking based on the state of a neighbor vehicle (e.g., the controller selects an entry method into the space based on the parking position of surrounding vehicles). For example, when the neighbor vehicle (e.g., a vehicle proximate to the subject vehicle) is parked as back-in parking (e.g., with the front of the vehicle facing outwards), the controller 20 may be configured to perform back-in parking where the rear of the vehicle enters the parking space, and when the neighbor vehicle is parked as front end parking (e.g., with the rear of the vehicle facing outward), the controller 20 may be configured to perform front end parking where the front of the vehicle may enter into the parking space.

When there is a mixture of a rear-side parked vehicle and a parked vehicle in the vicinity of the subject vehicle, the controller 20 may be configured to perform parking based on the parking direction of the vehicles occupying a larger number of vehicles. In addition, when any sign or posting that shows a preferable parking direction, for example "front parking" and "rear parking prohibited", is detected in the vicinity of the parking area, the controller 20 may be configured to detect a text recognized by the image recognition sensor, etc. and execute automatic parking based on a direction indicated by the text or image in the sign or posting.

Additionally, when an auto-hold function of the vehicle is in an ON state, the controller 20 may be configured to automatically release the auto-hold function and perform automatic parking, and when parking ends (e.g., is complete), the controller 20 may be configured to engage an electric parking brake (EPB) (P-position shifting, start off). When automatically pulling out the vehicle and the vehicle reaches a target position, the controller 20 may be configured to detect input (e.g., brake and acceleration engagement) of the driver and provide over a control right to the driver (e.g., shift the vehicle control to the driver). In other words, the automatic vehicle control may terminate and the driver may take over the control of the vehicle without controller intervention.

In addition, the controller 20 may be configured to perform control operations corresponding to driver's actions which may be assumed as interventions indicating that the driver does not intend for automatic parking. For example, the controller 20 may be configured to stop the vehicle and cancel automatic parking when a main switch of the vehicle is turned off or a shift P operation is input. In particular, the controller 20 may be configured to immediately stop vehicle movement and provide the driver with information which indicates both cancellation of the system control and an action for the driver to take. After driver's compliance, the system terminates the automatic control operation. Furthermore, when any of other shift operations, or steering is input, the controller 20 may stop the vehicle. In particular, the controller 20 may be configured to immediately stop vehicle movement and provide the driver with information which indicates both suspension of the system control and an action for the driver to take.

After driver's compliance, depending on the concept of the vehicle manufacturer or the driver's selection, the controller 20 may either re-start the automatic control or terminate it. When braking is input (e.g., a brake pedal is engaged) while automatic parking operation is activated, the controller 20 may be configured to operate according to the amount of braking by the driver (e.g., an engagement amount or amount of pressure exerted onto the brake pedal) when the amount of braking by the driver exceeds the amount of braking generated by the automatic parking support system. Thereafter, the display 30 may be operated by the controller 20 to display the first mode or the second mode. In particular, the display 30 may be configured to display the first mode or the second mode in various forms such as an image, text, video, and the like. The controller 20 may be configured to inform the user of one or more parking slots detected as a result of the search.

The sensor 40 may include an ultrasonic sensor configured to sense a distance to an obstacle, a steering angle sensor, a wheel pulse sensor, a yaw rate sensor, and a temperature sensor. The ultrasonic sensor may include a plurality of front ultrasonic sensors configured to sense an obstacle in front of a vehicle, a plurality of side ultrasonic sensors configured to sense a lateral obstacle (e.g., an obstacle disposed at the sides of the vehicle), a plurality of rear ultrasonic sensors (e.g., four rear ultrasonic sensors) configured to sense a movement of an obstacle at the rear side of the vehicle. In addition, the steering angle sensor, the wheel pulse sensor, and the yaw rate sensor may be configured to sense a steering direction and a steering angle of the vehicle. The sensor 40 may be used to search for possible parking slots.

Figure 2:
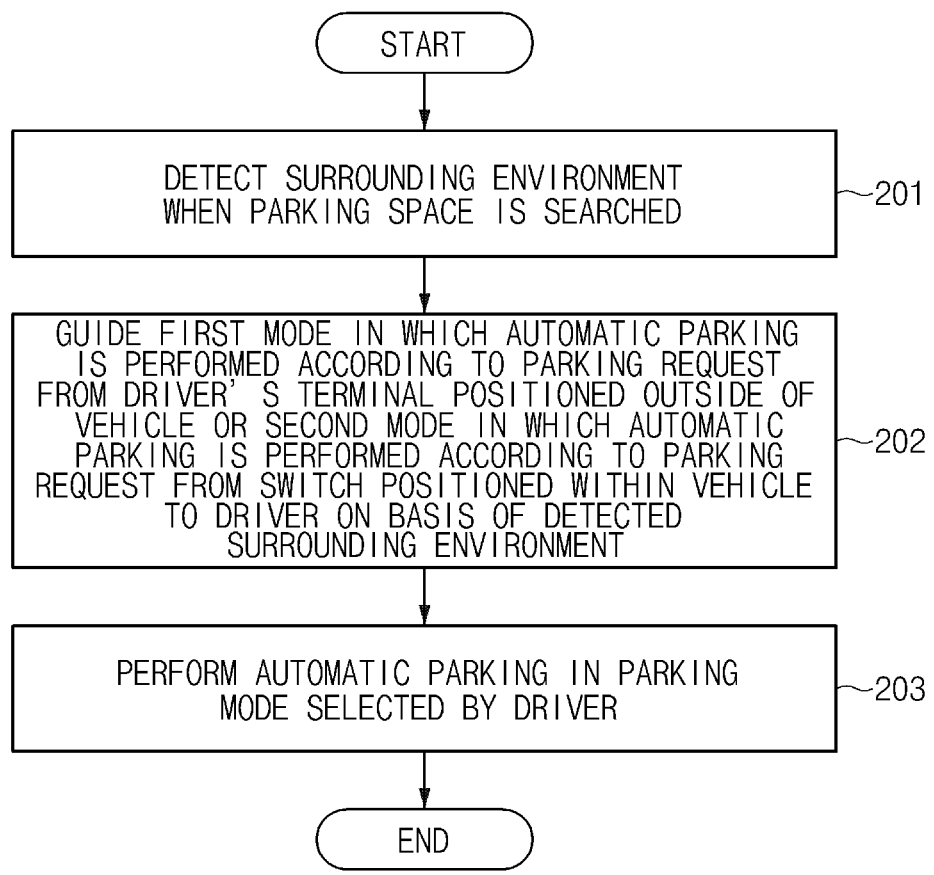
FIG. 2 is a flow chart illustrating an exemplary embodiment of a method for guiding a parking mode in a remote automatic parking support system according to the present disclosure.

FIG. 2 is a flow chart illustrating an exemplary embodiment of a parking mode guiding method in a remote automatic parking support system according to the present disclosure, which is performed under the control of the controller 20. First, the controller 20 may be configured to search for possible parking spaces and present possible candidates for the parking space to the driver; and may be configured to receive the driver's input indicating a desired parking space. When a parking space is detected, a surrounding environment may be detected in operation 201. In other words, a width of a parking space, weather conditions (e.g., rain, snow, etc.), an outdoor temperature, parking state of a neighbor vehicle, and the like may be determined using the sensor 40.

Upon receiving an authorization of automatic parking is received from a user, a first mode may be displayed on the display 30 in which automatic parking may be performed based on a parking request from a driver's terminal positioned extraneous to a vehicle or a second mode in which automatic parking may be performed based on a parking request from a switch mounted within the vehicle, based on the detected surrounding environment, in operation 202. Particularly, the user may be a driver or an operator. For example, when exiting the vehicle after parking is difficult due to space constraints or an average speed from a start point of searching for a parking space to an end point exceeds a threshold value, the vehicle may be guided in the first mode. Additionally, when a poor weather condition is detected (e.g., when it rains, when a temperature exceeds a first threshold value (e.g., about 30° C.), when the temperature is less than a second threshold voltage (e.g., about 5° C.), when it is snowing, and the like), the vehicle may be guided in the second mode.

Thereafter, when a parking mode is selected through the input part 10, automatic parking may be performed in the corresponding parking mode in operation 203. In particular, in performing automatic parking, the controller may be configured to automatically select front end parking or back-in parking based on the parking states of a neighbor vehicle. In other words, when the neighbor vehicle is parked as back-in parking, the controller 20 may be configured to perform back-in parking, and when the neighbor vehicle is parked as front end parking, the controller 20 may be configured to perform front end parking. Additionally, when an auto-hold function of the vehicle is in an ON state, the controller 20 may be configured to automatically release the auto-hold function and perform automatic parking. However, upon receiving a user intervention, the controller may be configured to perform one or more of stopping the vehicle and cancel the automatic parking. The user intervention includes braking, main switch OFF, shift operations, and steering.

Furthermore, when the vehicle reaches a desired parking space, the controller 20 may provide over a control of the vehicle to the driver when the vehicle reaches a desired parking space. Alternatively, when parking is complete, the controller 20 may be configured to engage the EPB (e.g., park (P) position shifting, start off). When automatically pulling out the vehicle (e.g., driving out of the parking space) and the vehicle reaches a target position, the controller 20 may be configured to detect driver input (e.g., brake and acceleration pedal engagement) and provide the driving control to the driver, that is, terminate the automatic control. Accordingly, optimal convenience may be provided to the driver.

As described above, in the remote automatic parking support system having the first mode in which automatic parking is performed based on a parking request from a smart key or a smartphone of a driver positioned extraneous to a vehicle and the second mode in which automatic parking is performed based on a parking request from a switch mounted within the vehicle, the vehicle may be guided in the first mode or the second mode through a screen (e.g., by the first or second modes being displayed on the screen) or by voice according to a surrounding environment, thereby providing optimal convenience to the driver.

The method of the present disclosure described above may also be created as a computer program, and codes and code segments configuring the program may be easily inferred by programmers in the art. In addition, the created program may be stored in a computer-readable recording medium (an information storage medium) and read and executed by a computer to implement the method of the present disclosure. The recording medium includes any type of recording medium that can be read by a computer.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A method for guiding a vehicle in a parking mode in an automatic parking support system, comprising:
    detecting, by a processor, a surrounding environment when a parking space is detected;
    receiving, by the processor, an authorization of automatic parking from a user;
    guiding, by the processor, the vehicle in a first parking mode in which automatic parking is performed based on a parking request from a user terminal positioned extraneous to a vehicle or a second parking mode in which automatic parking is performed based on a parking request from a driver within the vehicle, based on the detected surrounding environment;
    performing, by the processor, automatic parking in a parking mode selected by a user; and
    upon receiving a user intervention, performing, by the processor, one or more of stopping the vehicle and cancelling the automatic parking,
    wherein the user is the driver or an operator located outside the vehicle and remotely controls the vehicle,
    wherein the user intervention includes at least one of braking, main switch OFF, shift operations, and steering,
    wherein the performing of automatic parking in the parking mode selected by the user includes:
    upon the second parking mode being selected by the user:
        searching, by the processor, for a parking space and presenting possible candidates for the parking space to the driver; and
        receiving, by the processor, a driver input indicating a desired parking space, and
    wherein, in the guiding of the vehicle:
        when a width of the parking space is less than a reference value, the vehicle is guided in the first parking mode, and
        when at least one of rain is detected, an outdoor temperature exceeds a first threshold value, and the outdoor temperature is less than a second threshold value, the vehicle is guided in the second parking mode.

2. The method according to claim 1, further comprising:
    providing, by the processor, over a control of the vehicle to the driver when the vehicle reaches a desired parking space.

3. The method according to claim 1, wherein, in the detecting of the surrounding environment, at least one selected from the group consisting of: a width of the parking space, a weather condition, an outdoor temperature, and a parking state of a neighbor vehicle is detected.

4. The method according to claim 3, wherein, in the performing of the automatic parking, front end parking or back-in parking is automatically selected based on the parking state of the neighbor vehicle.

5. The method according to claim 1, wherein, in the automatic parking, when an auto-hold function of the vehicle is in an ON state, the auto-hold function is automatically released and automatic parking is performed.

6. The method according to claim 1, wherein, in the automatic parking, when automatic parking ends, park-position shifting is performed and an engine of the vehicle is subsequently turned off.

7. An automatic parking support system for a vehicle, comprising:
    an input configured to receive an input indicating a desired parking space, an authorization of automatic parking, and a selection signal regarding a parking mode from a user;
    a controller configured to guide the vehicle in a first parking mode in which automatic parking is performed based on a parking request from a user terminal or a second parking mode in which automatic parking is performed based on a parking request from a driver within the vehicle based on a surrounding environment and, when receiving a user intervention, to perform one or more of stopping the vehicle and cancelling the automatic parking;
    a sensor configured to detect the surrounding environment; and
    a display configured to output possible candidates for a parking space the first parking mode or the second parking mode,
    wherein the user is the driver or an operator located outside the vehicle and remotely controls the vehicle,
    wherein the user intervention includes at least one of braking, main switch OFF, shift operations, and steering,
    wherein the controller is further configured to:
    upon the second parking mode being selected by the user:
        search for a parking space and present possible candidates for the parking space to the driver; and receive a driver input indicating a desired parking space, and wherein, in the guiding of the vehicle:

when a width of the parking space is less than a reference value, the vehicle is guided in the first parking mode, and when at least one of rain is detected, an outdoor temperature exceeds a first threshold value, and the outdoor temperature is less than a second threshold value, the vehicle is guided in the second parking mode.

8. The system of claim 7, wherein the controller is further configured to provide over a control of the vehicle to the driver when the vehicle reaches a desired parking space.

9. The system of claim 7, wherein the surrounding environment detected by the sensor includes at least one selected from the group consisting of: a width of the parking space, a weather condition, an outdoor temperature, and a parking state of a neighbor vehicle is detected.

10. The system of claim 9, wherein front end parking or back-in parking is automatically selected based on the parking state of the neighbor vehicle.

11. A non-transitory computer readable medium containing program instructions executed by a processor for guiding a vehicle in a parking mode in an automatic parking support system, the computer readable medium comprising:

program instructions that detect a surrounding environment when a parking space is detected;

program instructions that receive an authorization of automatic parking from a user;

program instructions that guide the vehicle in a first parking mode in which automatic parking is performed based on a parking request from a user terminal positioned extraneous to a vehicle or a second parking mode in which automatic parking is performed based on a parking request from a driver within the vehicle, based on the detected surrounding environment;

program instructions that perform automatic parking in a parking mode selected by a user; and program instructions that perform one or more of stopping the vehicle and cancelling the automatic parking upon receiving a user intervention, wherein the user is the driver or an operator located outside the vehicle and remotely controls the vehicle, wherein the user intervention includes at least one of braking, main switch OFF, shift operations, and steering, wherein the program instructions that perform automatic parking in the parking mode selected by the user includes:

upon the second parking mode being selected by the user:

program instructions that search for a parking space and present possible candidates for the parking space to the driver; and program instructions that receive a driver input indicating a desired parking space, and wherein, in the guiding of the vehicle:

when a width of the parking space is less than a reference value, the vehicle is guided in the first parking mode, and when at least one of rain is detected, an outdoor temperature exceeds a first threshold value, and the outdoor temperature is less than a second threshold value, the vehicle is guided in the second parking mode.

* * * * *

UNITED STATES PATENT AND TRADEMARK OFFICE
CERTIFICATE OF CORRECTION

Page 1 of 1

PATENT NO. : 10,606,272 B2
APPLICATION NO. : 15/653830
DATED : March 31, 2020
INVENTOR(S) : Gil Won Seo et al.

It is certified that error appears in the above-identified patent and that said Letters Patent is hereby corrected as shown below:

On the Title Page

At (71) Applicant:, please replace:
"Hyundai Motor Company, Seoul (KR)"

With:
"Hyundai Motor Company, Seoul (KR)
Kia Motors Corporation, Seoul (KR)"

Signed and Sealed this
Eleventh Day of May, 2021

Drew Hirshfeld
*Performing the Functions and Duties of the*
*Under Secretary of Commerce for Intellectual Property and*
*Director of the United States Patent and Trademark Office*